US008444465B2

(12) United States Patent
Macaulay

(10) Patent No.: US 8,444,465 B2
(45) Date of Patent: May 21, 2013

(54) ULTIMATE FOUR OF A KIND BONUS POKER

(75) Inventor: Donna Lee Macaulay, Las Vegas, NV (US)

(73) Assignee: IGT, Reno, NV (US)

( * ) Notice: Subject to any disclaimer, the term of this patent is extended or adjusted under 35 U.S.C. 154(b) by 1735 days.

(21) Appl. No.: 10/906,928

(22) Filed: Mar. 13, 2005

(65) Prior Publication Data

US 2005/0202863 A1 Sep. 15, 2005

Related U.S. Application Data

(60) Provisional application No. 60/553,369, filed on Mar. 15, 2004.

(51) Int. Cl.
*A63F 9/24* (2006.01)
*A63F 13/00* (2006.01)
*G06F 17/00* (2006.01)
*G06F 19/00* (2006.01)

(52) U.S. Cl.
USPC .......... 463/13

(58) Field of Classification Search
USPC .......... 463/12, 13, 20
See application file for complete search history.

(56) References Cited

U.S. PATENT DOCUMENTS 4,582,324 A 4/1986 Koza et al.
5,647,798 A 7/1997 Falciglia
5,823,873 A * 10/1998 Moody .......... 463/13
5,851,148 A * 12/1998 Brune et al. .......... 463/25
5,855,514 A 1/1999 Kamille
6,015,346 A 1/2000 Bennett
6,102,798 A 8/2000 Bennett
6,126,542 A * 10/2000 Fier .......... 463/16
6,149,156 A 11/2000 Feola
6,155,925 A 12/2000 Giobbi et al.
6,159,098 A 12/2000 Slomiany et al.
6,174,235 B1 1/2001 Walker et al.
6,186,894 B1 2/2001 Mayeroff
6,224,483 B1 5/2001 Mayeroff
6,231,442 B1 5/2001 Mayeroff
6,261,177 B1 7/2001 Bennett
6,309,300 B1 * 10/2001 Glavich .......... 463/26
6,312,334 B1 11/2001 Yoseloff
6,345,823 B1 2/2002 Webb
6,371,851 B1 4/2002 Singer et al.
6,375,187 B1 4/2002 Baerlocher
6,402,150 B1 6/2002 Jones (Continued)

*Primary Examiner* — David L Lewis
*Assistant Examiner* — Reginald Renwick
(74) *Attorney, Agent, or Firm* — Neal, Gerber & Eisenberg LLP

(57) ABSTRACT

The elegance and simplicity of the present invention is its taking pure electronic video poker in a new direction. This invention, with a portal, takes video poker from a static, single screen playing field with known values to a video poker format with a portal into another playing screen whenever any four of a kind, with maximum coins bet, is made by the player. This invention has a primary playing screen, a portal into an informative secondary screen which moves into a bonus screen. The player becomes interactive with the game on the bonus screen and choices he makes on the touch screen determine the amount of winnings the player will receive. When play has finished on the bonus screen, the primary screen returns and regular play video poker resumes.
This innovative invention with a portal into other screens allows the player to be interactive in this game in determining their own winnings.

10 Claims, 2 Drawing Sheets

Ultimate Four of a Kind Bonus Poker Paytable

| | *1st Coin* | *2nd Coin* | *3rd Coin* | *4th Coin* | *5th Coin* |
|---|---|---|---|---|---|
| Royal Flush | 250 | 500 | 750 | 1000 | 4000 |
| Striaght Flush | 50 | 100 | 150 | 200 | 250 |
| *4 Aces* | 80 | 160 | 240 | 320 | *Enter Bonus Screen* |
| *4 2s, 3s or 4s* | 60 | 120 | 180 | 240 | *Enter Bonus Screen* |
| *4 5s Through Ks* | 40 | 80 | 120 | 160 | *Enter Bonus Screen* |
| Full House | 8 | 16 | 24 | 32 | 40 |
| Flush | 5 | 10 | 15 | 20 | 25 |
| Striaght | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

U.S. PATENT DOCUMENTS

| | | | | |
|---|---|---|---|---|
| 6,406,369 | B1 | 6/2002 | Baerlocher et al. | |
| 6,439,995 | B1 | 8/2002 | Hughs-Baird et al. | |
| 6,471,208 | B2 * | 10/2002 | Yoseloff et al. | 273/143 R |
| 6,478,675 | B1 | 11/2002 | Awada | |
| 6,506,118 | B1 | 1/2003 | Baerlocher et al. | |
| 6,602,137 | B2 | 8/2003 | Kaminkow et al. | |
| 6,607,438 | B2 | 8/2003 | Baerlocher et al. | |
| 6,632,141 | B2 * | 10/2003 | Webb et al. | 463/25 |
| 6,648,754 | B2 | 11/2003 | Baerlocher et al. | |
| 6,729,961 | B1 | 5/2004 | Millerschone | |
| 6,733,386 | B2 | 5/2004 | Cuddy et al. | |
| 6,780,110 | B2 | 8/2004 | Baerlocher et al. | |
| 6,793,578 | B2 * | 9/2004 | Luccesi et al. | 463/20 |
| 7,029,395 | B1 | 4/2006 | Baerlocher | |
| 7,052,392 | B2 | 5/2006 | Tessmer et al. | |
| 7,160,190 | B2 | 1/2007 | Baerlocher et al. | |
| 7,387,568 | B2 | 6/2008 | Millerschone | |
| 7,390,258 | B2 | 6/2008 | Millerschone | |
| 7,393,276 | B2 | 7/2008 | Millerschone | |
| 2003/0008705 | A1 | 1/2003 | Baerlocher et al. | |
| 2003/0162578 | A1 * | 8/2003 | Baerlocher et al. | 463/16 |
| 2003/0189290 | A1 * | 10/2003 | Moody | 273/292 |
| 2004/0102234 | A1 * | 5/2004 | Gold | 463/13 |
| 2004/0116174 | A1 | 6/2004 | Baerlocher et al. | |
| 2005/0026665 | A1 * | 2/2005 | Gerrard et al. | 463/13 |
| 2006/0060266 | A1 | 3/2006 | Bales et al. | |
| 2006/0223611 | A1 | 10/2006 | Baerlocher et al. | |

* cited by examiner

Ultimate Four of a Kind Bonus Poker Paytable

| | *1st Coin* | *2nd Coin* | *3rd Coin* | *4th Coin* | *5th Coin* |
|---|---|---|---|---|---|
| Royal Flush | 250 | 500 | 750 | 1000 | 4000 |
| Striaght Flush | 50 | 100 | 150 | 200 | 250 |
| *4 Aces* | 80 | 160 | 240 | 320 | *Enter Bonus Screen* |
| *4 2s, 3s or 4s* | 60 | 120 | 180 | 240 | *Enter Bonus Screen* |
| *4 5s Through Ks* | 40 | 80 | 120 | 160 | *Enter Bonus Screen* |
| Full House | 8 | 16 | 24 | 32 | 40 |
| Flush | 5 | 10 | 15 | 20 | 25 |
| Striaght | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

Fig. 1

ULTIMATE FOUR OF A KIND BONUS POKER

CROSS-REFERENCE TO RELATED APPLICATION

This application is based on and claims priority of Provisional Application Sr. No. 60/553,369 filed Mar. 15, 2004 entitled "Ultimate Four of a Kind Bonus Poker."

BACKGROUND OF INVENTION

This invention relates primarily to electronic video poker played by a single player against a pay table with known and unknown values. As opposed to other video poker games that exist and are played on a single, static screen with known values, this innovative invention has a portal that takes a player into another playing screen when four of a kind are made with maximum coins bet (5). The primary playing screen is replaced by a secondary screen welcoming the player, describing the upcoming playing screen, followed by a "Shuffle Up and Deal" button icon, which the player must touch in order to move into the new playing (bonus) screen. When the bonus screen appears a deck of 52 cards plus the joker (bonus card) is dealt face down. The player now becomes interactive with this invention in determining what he wins. The number of picks the player has on this bonus screen is determined by the four of a kind he has made on the primary screen. All cards have specific monetary values, when the player picks (touches) a card, it immediately flips over and the player can see what he has won, the total accruing in a box in the right hand corner of the bonus screen. When all picks are made, the remaining cards flip over so the player can see the rest of the deck including the most important card, the joker. The primary playing screen reappears, all money or credits from the bonus screen transfer into the player's main screen total amount and normal play resumes. This present invention is elegant in its simplicity and beauty of play. This video poker invention with a portal into literally anywhere, with unlimited possibilities, is innovative and totally interactive with the player in determining what they win.

BRIEF SUMMARY OF THE INVENTION

The elegance of this present invention is its taking pure video poker to a new level of play. This invention, with a portal, changes the face of video poker, taking it from a static, single screen playing field with known value pay tables to a video poker format, with a window into endless possibilities, on the back side of this invention. Player interaction in determining their own fate, with regard to winnings, is also a very powerful part of this present invention. This video poker game is unique in conceptual design and dimensional format. Any type of game can be put on the backside of this format.

General Format of Invention: The player is dealt a single five-card hand from a standard fifty-two card poker deck. The pay table (FIG. 1) shows the player, in order to go into the bonus screen, he must play the maximum coins (5) per hand. All cards dealt with a lesser amount wagered (1 to 4 coins) have their values on the pay table. When a player has won any four of a kind with maximum coins bet, the primary screen is replaced with a secondary screen welcoming the player in to the upcoming bonus screen, with explanations on play and number of choices. The player proceeds to the bonus screen after he touches a button icon saying "Shuffle Up and Deal."

Depending on which four of a kind the player has made, with maximum coins bet, determines the number of picks the player will receive when going into the bonus screen:

| | |
|---|---|
| Four aces | three picks. |
| Four twos, threes, or fours | two picks. |
| Four fives through kings | one pick. |

Value of the deck of cards (FIG. 2) plus the joker, dealt on the bonus screen: Example: A quarter video poker game.

| | |
|---|---|
| Joker | $1000.00 |
| Aces (4) | $100.00 |
| Twos, threes or fours (12) | $75.00 |
| Fives through kings (36) | $50.00 |

Regardless of denomination played, the Joker (bonus card) is the same payout as the Royal Flush. Example: On a nickel machine, the Joker would pay $200.00. All pays are relative to the denomination played.

Example: A player has moved into the bonus screen having hit four threes. The cards have been dealt face down and he will make two picks. He touches one of the cards and the Queen of Spades flips over, so far he has won $50.00. He touches another card, the Ace of Hearts flips over for $100.00. The player has won a total of $150.00. This player has just determined his own fate in the amount of money he has won, a very powerful emotion. Of course what anyone who plays this wants to do is pick the Joker. The interaction between this present invention and the player is unlike any other. The potential to win an amount similar to the Royal Flush on the turn of a card, that you yourself have chosen, is unique. If the player turns over the Joker, a celebratory message with stars and confetti, explodes out of the card for 5 seconds then retracts back into the card. Once all picks have been made, the player will be returned to the primary playing with the amount won in the bonus screen, being added to his main screen credits.

BRIEF DESCRIPTION OF DRAWINGS

FIG. 1 is a representation of the pay table display for the present invention.

DESCRIPTION OF THE PREFERRED EMBODIMENT

Primary Screen

Figure 2:
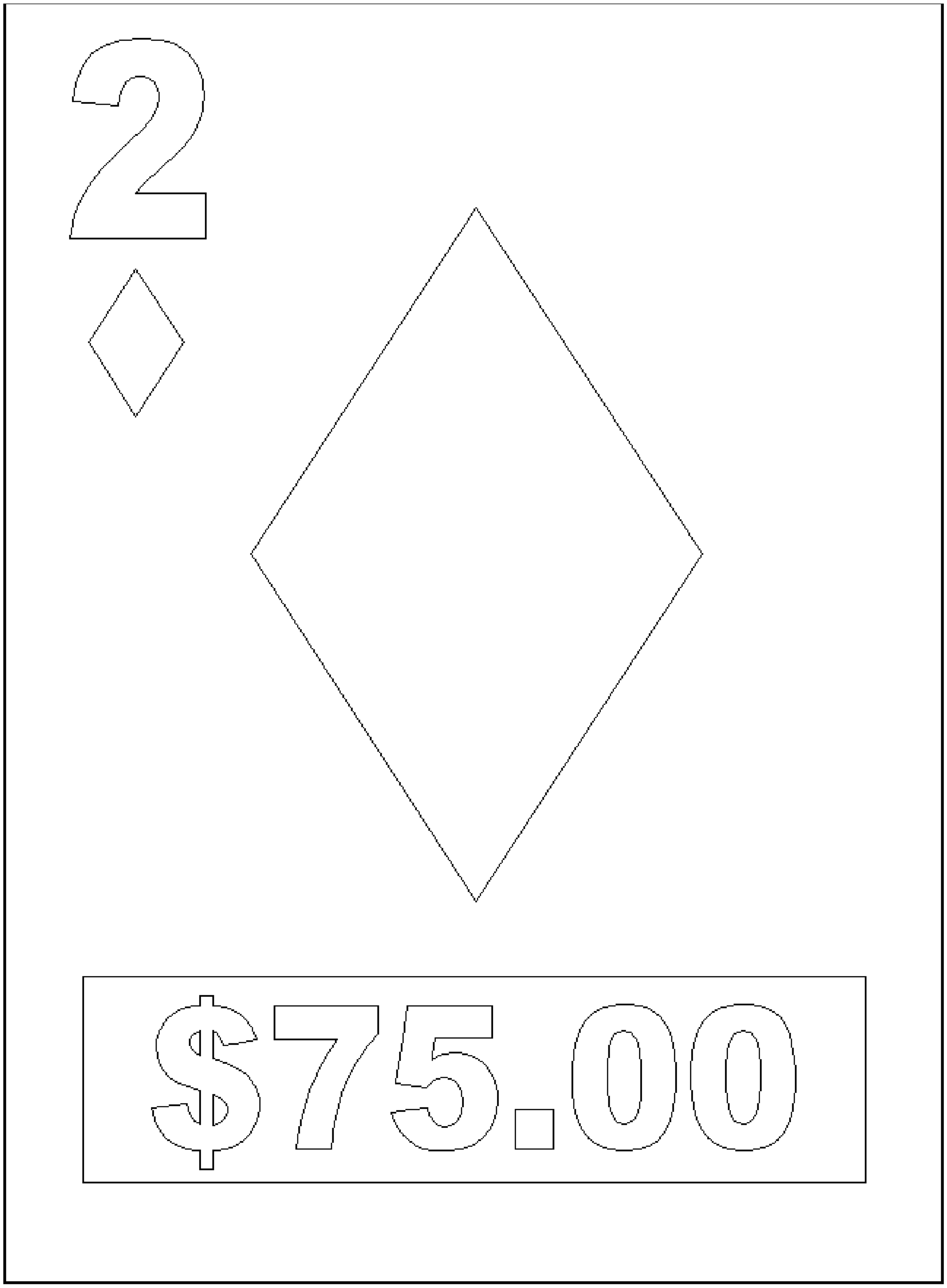
FIG. 2 is a representation of the design for the front (face) side of a card in the Bonus Screen.

The present invention is an electronic video poker game designed to be played by a single player on a video screen using a fifty-two card poker deck. Once the player chooses the amount he wishes to wager he presses the "bet one credit" button or the "max bet" button or one of the icons on the touch screen to begin play. The initial deal of five cards begins play, where the player may choose to keep or discard one or all of the cards on the video screen, cards being replaced for the discards after the draw button is pushed or the similar icon on the screen is touched. The player can achieve this by using buttons on the machine or using the touch screen.

The outcome of this play determines whether the player has a winning hand or not. The player can look at the pay table to see what constitutes a winning hand. A player is paid according to the pay table values and number of coins bet on the hand. Unlike other video poker pay tables, the present invention has three spaces on the pay table which state "ENTER BONUS SCREEN" in them. Those being the five coins bet column for any winning hand of four of a kind.

Entering the Secondary Screen

When the player has made four of a kind on the primary playing screen, that screen disappears and a secondary screen appears welcoming the player into the upcoming playing screen, a bonus screen. Information on this screen also describes the bonus screen, how to play and the number of selections the player will make. Also note, various modifications, additions and words may be added to this screen, clarity being the most important feature. At the end of the information will be a large "SHUFFLE UP AND DEAL!" button (icon), centered towards the bottom of the screen, that the player must touch with his finger in order to move into the bonus screen. Once a player has read this screen and knows the format, the next time he has made any four of a kind with maximum coins bet, the transition time from the primary screen to the bonus screen is minimal, just touch the 'SHUFFLE UP AND DEAL' icon to move into the bonus screen.

Entering the Bonus Screen

When this screen appears, fifty-two cards from a poker deck plus the Joker are dealt face down. Also on this screen, the player is informed on the number of selections he will make. The player is now in the position of determining his own fate concerning the amount he wins. This is a very powerful connection between the present invention and the player. The player is interactive with this game, he is participating in and determining through his own selections, what amounts he will make in the bonus screen. All fifty-three cards are assigned a monetary value relative to the denomination being played. The beauty and simplicity of this invention, in the bonus screen, is the fact that anyone has the potential to win an amount equal to that of a Royal Flush with maximum coins played, for any four of a kind. When the player has made his choice(s), the screen reverts back to the original primary playing screen, all money or credits won in the bonus screen are transferred to the player's primary screen total or credits. Normal play resumes.

While the present invention has been with respect to specific embodiments, they should be considered illustrative rather than limiting. Various modifications and additions may be made and will be apparent to those skilled in the art. Therefore, the present invention should not be limited by the foregoing description but rather, be defined by the following claims.

What is claimed is:

1. A gaming device comprising:

a display device;

an input device;

a processor; and a memory device which stores a plurality of instructions, which when executed by the processor, cause the processor to operate with the display device and the input device to control each play of a poker game by:

(a) upon placement of a wager amount, causing a display of a plurality of playing cards in a primary poker game, wherein different pluralities of playing cards form a plurality of different poker hands, a first triggering event is associated with a first set of said poker hands, said first set of said poker hands including a first quantity of at least one poker hand, a second different triggering event is associated with a different, second set of said poker hands, said second set of said poker hands including at least one different poker hand than said first set of poker hands and said second set of said poker hands including a greater quantity of poker hands than the first set of poker hands;

(b) enabling a player to select zero, one or more of said displayed playing cards to discard;

(c) for each displayed playing card the player selected to discard, removing said selected playing card and causing a display of another one of said playing cards, wherein said displayed playing cards form one of said poker hands;

(d) if the formed poker hand is one of the first set of poker hands associated with the first triggering event, providing a bonus game such that the player has a first probability of being provided a designated award in the bonus game, wherein for each play of the bonus game: (i) a plurality of symbols of the bonus game are each determined regardless of each of the playing cards of the poker game, (ii) a number of said symbols of the bonus game is determined regardless of a total number of the playing cards displayed for the formed poker hand, (iii) the bonus game is separate from the primary poker game, and (iv) the bonus game is a different game than the poker game; and (e) if the formed poker hand is one of the second set of poker hands associated with the second triggering event, providing the bonus game such that the player has a different, second probability of being provided the designated award in the bonus game.

2. The gaming device of claim 1, wherein for each play of the bonus game, the plurality of symbols are each associated with an award and at least one of the symbols is associated with the designated award.

3. The gaming device of claim 2, wherein when executed by the processor, said plurality of instructions cause the processor to control a play of the bonus game by:

(i) determining a quantity of picks of said symbols, wherein the quantity of picks is based on the triggering event associated with the bonus game;

(ii) enabling the player to select one of the symbols for each determined quantity of picks; and (iii) providing the player any awards associated with any picked symbols.

4. The gaming device of claim 1, wherein a plurality of said different poker hands are each associated with an award and at least one of said poker hands is associated with the designated award.

5. The gaming device of claim 4, wherein when executed by the processor, said plurality of instructions cause the processor to control the play of the poker game by providing the player any award associated with the formed poker hand.

6. A method of operating a gaming device, said method comprising:

(a) causing a display device to display a plurality of playing cards in a primary poker game operable upon a wager amount, wherein different pluralities of said playing cards form a plurality of different poker hands;

(b) enabling a player to select at least one of said displayed playing cards to discard;

(c) for each of any of said playing cards the player selected to discard, removing said selected playing card and causing the display device to display another one of said playing cards, wherein said displayed playing cards form one of said poker hands;

(d) if the formed poker hand is one of said poker hands in a first set of said poker hands which is associated with a first triggering event, providing a bonus game such that the player has a first probability of being provided a designated award in the bonus game, wherein for each play of the bonus game: (i) a plurality of symbols of the bonus game are each determined regardless of each of the playing cards of the poker game, (ii) a number of said symbols of the bonus game is determined regardless of a total number of the playing cards displayed for the formed poker hand, (iii) the bonus game is separate from the primary poker game, and (iv) the bonus game is a different game than the poker game, said first set of said poker hands includes a first quantity of at least one poker hand; and (e) if the formed poker hand is one of said poker hands in a different, second set of said poker hands which is associated with a second, different triggering event, providing the bonus game such that the player has a different, second probability of being provided the designated award in the bonus game, wherein said second set of said poker hands includes at least one different poker hand than said first set of poker hands and said second set of said poker hands including a greater quantity of poker hands than the first set of poker hands.

7. The method of claim 6, wherein for each play of the bonus game, the plurality of symbols are each associated with an award and at least one of the symbols is associated with the designated award.

8. The method of claim 7, wherein a play of the bonus game includes:

(i) determining a quantity of picks of said symbols, wherein the quantity of picks is based on the triggering event associated with the bonus game;

(ii) enabling the player to select one of the symbols for each determined quantity of picks; and (iii) providing the player any awards associated with any picked symbols.

9. The method of claim 6, wherein a plurality of said different poker hands are each associated with an award and at least one of said poker hands is associated with the designated award.

10. The method of claim 9, which includes providing the player any award associated with the formed poker hand.

* * * * *

UNITED STATES PATENT AND TRADEMARK OFFICE

CERTIFICATE OF CORRECTION

PATENT NO. : 8,444,465 B2
APPLICATION NO. : 10/906928
DATED : May 21, 2013
INVENTOR(S) : Donna Lee Macaulay It is certified that error appears in the above-identified patent and that said Letters Patent is hereby corrected as shown below:

IN THE CLAIMS

In Claim 1, Column 3, Line 57, between “a” and “poker” insert --primary--.
In Claim 1, Column 3, Line 59, replace “a primary” with --the primary--.
In Claim 1, Column 3, Line 67, between “of” and “poker” insert --said--.
In Claim 1, Column 4, Line 2, after “set of” insert --said--.
In Claim 1, Column 4, Line 11, between “of” and “poker” insert --said--.
In Claim 1, Column 4, Line 23, between “the” and “poker” insert --primary--.
In Claim 1, Column 4, Line 24, after “set of” insert --said--.
In Claim 5, Column 4, Line 49, between “the” and “poker” insert --primary--.
In Claim 6, Column 5, Line 9, between “the” and “poker” insert --primary--.
In Claim 6, Column 5, Line 10, replace “includes” with --including--.
In Claim 6, Column 5, Lines 19 and 21, between “of” and “poker” insert --said--.

Signed and Sealed this
Twenty-seventh Day of August, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,444,465 B2
APPLICATION NO. : 10/906928
DATED : May 21, 2013
INVENTOR(S) : Donna Lee Macaulay It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1853 days.

Signed and Sealed this
Sixteenth Day of December, 2014

Michelle K. Lee

Michelle K. Lee
*Deputy Director of the United States Patent and Trademark Office*